(12) United States Patent
Ooba (10) Patent No.: US 10,603,793 B2
(45) Date of Patent: Mar. 31, 2020

(54) WORK ASSISTING SYSTEM INCLUDING MACHINE LEARNING UNIT (71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 214 days.

(21) Appl. No.: 15/726,818

(22) Filed: Oct. 6, 2017

(65) Prior Publication Data

US 2018/0126558 A1 May 10, 2018

(30) Foreign Application Priority Data

Oct. 7, 2016 (JP) .................................. 2016-198717

(51) Int. Cl.
*B25J 9/16* (2006.01)
*B25J 19/06* (2006.01)
(Continued)

(52) U.S. Cl.
CPC ............. *B25J 9/1694* (2013.01); *B25J 9/161* (2013.01); *B25J 9/163* (2013.01); *B25J 13/089* (2013.01);
(Continued)

(58) Field of Classification Search
CPC . B25J 9/1694; B25J 9/161; B25J 9/163; B25J 13/089; B25J 19/06; B25J 9/1669;
(Continued)

(56) References Cited

U.S. PATENT DOCUMENTS 8,718,822 B1 * 5/2014 Hickman ............... B25J 9/1674
700/214
2008/0221730 A1 9/2008 Sakata et al.
(Continued)

FOREIGN PATENT DOCUMENTS

CN 101970185 A 2/2011
JP H01199753 A 8/1989
(Continued)

OTHER PUBLICATIONS

Japanese Office Action dated Oct. 16, 2018, for Japanese Patent Application No. 2016-198717.
(Continued)

*Primary Examiner* — Bao Long T Nguyen
(74) *Attorney, Agent, or Firm* — Karceski IP Law, PLLC (57) ABSTRACT

A work assisting system includes a sensor unit that detects a position and an orientation of at least one body part of a worker; a supply unit that supplies a part or a tool to the worker; and a cell controller that controls the supply unit, the cell controller including a machine learning unit that constructs a model by learning a work status of the worker on the basis of the detected position and orientation, and a work status determining unit that determines the work status of the worker by using the constructed model. The supply unit selects the part or tool on the basis of the determined work status and changes the position and orientation of the part or tool on the basis of the position and orientation of the at least one body part.

6 Claims, 6 Drawing Sheets

| STEP | WORK STATUS | ROBOT MOVEMENT |
|---|---|---|
| | CHASSIS WAIT | SUPPLY CHASSIS |
| COVER ATTACHMENT | COVER WAIT | SUPPLY COVER |
| | COVER ATTACHMENT IN PROGRESS | STAND-BY |
| | DRIVER WAIT | SUPPLY DRIVER |
| | SCREW WAIT | SUPPLY SCREW |
| | SCREW FASTENING IN PROGRESS | STAND-BY |
| SCREW FASTENING | SCREW WAIT | SUPPLY SCREW |
| | SCREW FASTENING IN PROGRESS | STAND-BY |
| | SCREW WAIT | SUPPLY SCREW |
| | SCREW FASTENING IN PROGRESS | STAND-BY |
| | SCREW WAIT | SUPPLY SCREW |
| | SCREW FASTENING IN PROGRESS | STAND-BY |

(51) Int. Cl.
  *B25J 13/08* (2006.01)
  *G05B 19/418* (2006.01)
  *G05B 19/423* (2006.01)
  *G06K 9/00* (2006.01)
  *G06N 3/08* (2006.01)

(52) U.S. Cl.
  CPC .......... *B25J 19/06* (2013.01); *G05B 19/4183* (2013.01); *G05B 19/423* (2013.01); *G06K 9/00382* (2013.01); *G05B 2219/40198* (2013.01); *G05B 2219/40202* (2013.01); *G05B 2219/40409* (2013.01); *G06N 3/08* (2013.01)

(58) Field of Classification Search
  CPC .. B25J 9/1697; G05B 19/4183; G05B 19/423; G05B 2219/40202; G05B 2219/40409; G05B 2219/40198; G05B 19/402; G05B 19/4187; G05B 19/41815; G06K 9/00382; G06N 3/08
  USPC ........ 700/245, 179, 246, 253; 706/12; 483/1
  See application file for complete search history.

(56) References Cited

U.S. PATENT DOCUMENTS

| | | | |
|---|---|---|---|
| 2009/0299933 A1 | 12/2009 | Aoyama et al. | |
| 2011/0184555 A1* | 7/2011 | Kosuge | B25J 9/1664 700/245 |
| 2013/0245822 A1 | 9/2013 | Kawanami et al. | |
| 2013/0245882 A1 | 9/2013 | Kawanami et al. | |
| 2015/0352719 A1 | 12/2015 | Nakazato et al. | |
| 2016/0082590 A1 | 3/2016 | Kawanami et al. | |
| 2016/0089782 A1* | 3/2016 | Sisbot | B25J 9/163 700/250 |
| 2016/0224892 A1 | 8/2016 | Sawada et al. | |
| 2017/0032186 A1 | 2/2017 | Murata et al. | |
| 2018/0126555 A1 | 5/2018 | Nakazato et al. | |
| 2019/0009409 A1 | 1/2019 | Kawanami et al. | |

FOREIGN PATENT DOCUMENTS

| | | |
|---|---|---|
| JP | 2003080484 A | 3/2003 |
| JP | 2008246665 A | 10/2008 |
| JP | 2009119579 A | 6/2009 |
| JP | 2009137527 A | 6/2009 |
| JP | 2009288934 A | 12/2009 |
| JP | 2010224878 A | 10/2010 |
| JP | 2013151063 A | 8/2013 |
| JP | 2013184273 A | 9/2013 |
| JP | 201418927 A | 2/2014 |
| JP | 2015071206 A | 4/2015 |
| JP | 2015171394 A | 10/2015 |
| JP | 2015230621 A | 12/2015 |
| JP | 2016143094 A | 8/2016 |
| WO | 2015178078 A1 | 11/2015 |
| WO | 2015186436 A1 | 12/2015 |

OTHER PUBLICATIONS

Japanese Search Report from Registered Searching Authority dated Oct. 16, 2018, for Japanese Patent Application No. 2016-198717.
Japanese Office Action dated Feb. 19, 2019, for Japanese Patent Application No. 2016-198717.
Japanese Office Action dated Aug. 13, 2019, for Japanese Patent Application No. 2016198717.

* cited by examiner

| STEP | WORK STATUS | ROBOT MOVEMENT |
|---|---|---|
| COVER ATTACHMENT | CHASSIS WAIT | SUPPLY CHASSIS |
| COVER ATTACHMENT | COVER WAIT | SUPPLY COVER |
| COVER ATTACHMENT | COVER ATTACHMENT IN PROGRESS | STAND-BY |
| SCREW FASTENING | DRIVER WAIT | SUPPLY DRIVER |
| SCREW FASTENING | SCREW WAIT | SUPPLY SCREW |
| SCREW FASTENING | SCREW FASTENING IN PROGRESS | STAND-BY |
| SCREW FASTENING | SCREW WAIT | SUPPLY SCREW |
| SCREW FASTENING | SCREW FASTENING IN PROGRESS | STAND-BY |
| SCREW FASTENING | SCREW WAIT | SUPPLY SCREW |
| SCREW FASTENING | SCREW FASTENING IN PROGRESS | STAND-BY |
| SCREW FASTENING | SCREW WAIT | SUPPLY SCREW |
| SCREW FASTENING | SCREW FASTENING IN PROGRESS | STAND-BY |

FIG. 6

WORK ASSISTING SYSTEM INCLUDING MACHINE LEARNING UNIT

CROSS-REFERENCE TO RELATED APPLICATION

This application is based on and claims priority to Japanese Patent Application No. 2016-198717, filed on Oct. 7, 2016, the entire content of which is incorporated herein by reference.

FIELD OF THE INVENTION

The present invention relates to a work assisting system including a machine learning unit.

BACKGROUND OF THE INVENTION

Typically, a worker engaged in assembly work at a manufacturing site has been required to fetch parts, tools, etc., needed for the assembly work from storage sites. As a result, there have been issues of loss of time and degraded work efficiency.

To address these issues, the publication of Japanese Patent No. 5717033 discloses a work assisting system that estimates the work situation by statistically processing the position of the worker and supplies parts and tools according to the work situation.

SUMMARY OF THE INVENTION

The present invention provides the following solutions.

An aspect of the present invention is directed to a work assisting system that includes a sensor unit that detects a position and an orientation of at least one body part of a worker; a supply unit that supplies a part or a tool to the worker; and a cell controller that controls the supply unit, the cell controller including a machine learning unit that constructs a model by learning a work status of the worker on the basis of the detected position and orientation, and a work status determining unit that determines the work status of the worker by using the constructed model, in which the supply unit selects the part or tool on the basis of the determined work status and changes the position and orientation of the part or tool on the basis of the position and orientation of the at least one body part.

DESCRIPTION OF THE EMBODIMENTS

A work assisting system according to one embodiment of the present invention is described below with reference to the drawings.

Figure 1:
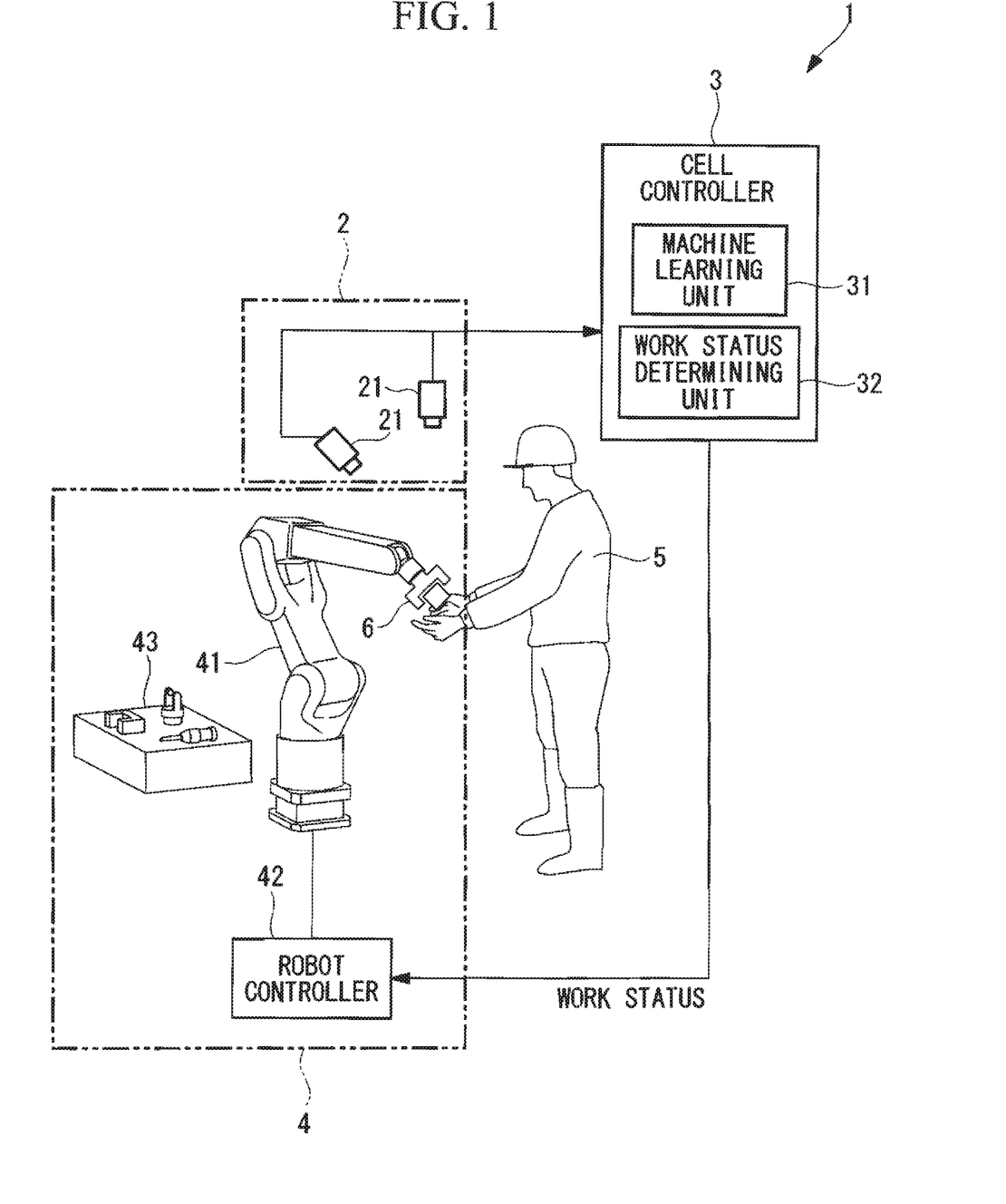
FIG. 1 is a diagram illustrating the overall configuration of a work assisting system according to one embodiment of the present invention.

As illustrated in FIG. 1, a work assisting system 1 includes a sensor unit 2, a cell controller 3 connected to the sensor unit 2, and a supply unit 4 connected to the cell controller 3.

The sensor unit 2 includes cameras 21, which are vision sensors, and is configured to sequentially detect positions and orientations of body parts (for example, the hands, foot, head, etc.) of a worker 5. In this embodiment, two cameras 21 are provided, but the number of cameras 21 may be one or more than one.

The cell controller 3 is configured to determine the current work status of the worker on the basis of the positions and orientations of the body parts of the worker 5 detected by the sensor unit 2. The cell controller 3 includes a processor (not illustrated in the drawing) and a memory device, such as a read-only memory (ROM) or a random access memory (RAM) (not illustrated in the drawing), and is configured so that the functions described below are executed by the processor. The cell controller 3 includes functional blocks, which are a machine learning unit 31 and a work status determining unit 32.

Figure 2:
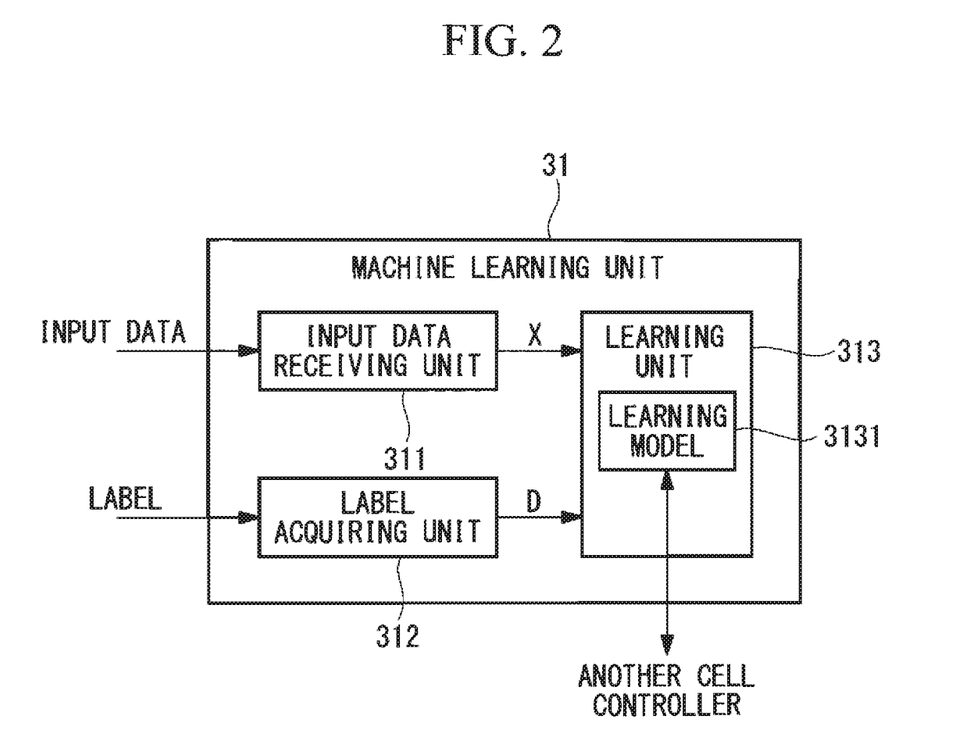
FIG. 2 is a block diagram illustrating the overall configuration of a machine learning unit of a cell controller in the work assisting system illustrated in FIG. 1.

As illustrated in FIG. 2, the machine learning unit 31 includes an input data receiving unit 311, a label acquiring unit 312, and a learning unit 313.

The input data receiving unit 311 is configured to receive, as input data, the positions and orientations of the body parts of the worker 5 detected by the sensor unit 2, to perform pre-processing, such as normalization, to enable machine learning, and to supply pre-processed learning data $X=\{x_1, x_2, \ldots x_n\}$ to the learning unit 313.

The label acquiring unit 312 is configured to acquire the training data, i.e., a label, required for supervised learning, to perform pre-processing, such as normalizing, to enable machine learning, and to supply the pre-processed learning label $D=\{d_1, d_2, \ldots d_m\}$ to the learning unit 313.

The learning unit 313 is configured to construct a learning model (model) 3131 on the basis of the learning data X acquired in the input data receiving unit 311 and the learning labels D pre-processed in the label acquiring unit 312. The learning model 3131 is constructed by providing a large quantity of sets of the learning input data X and the learning labels D to the learning unit 313.

Figure 3:
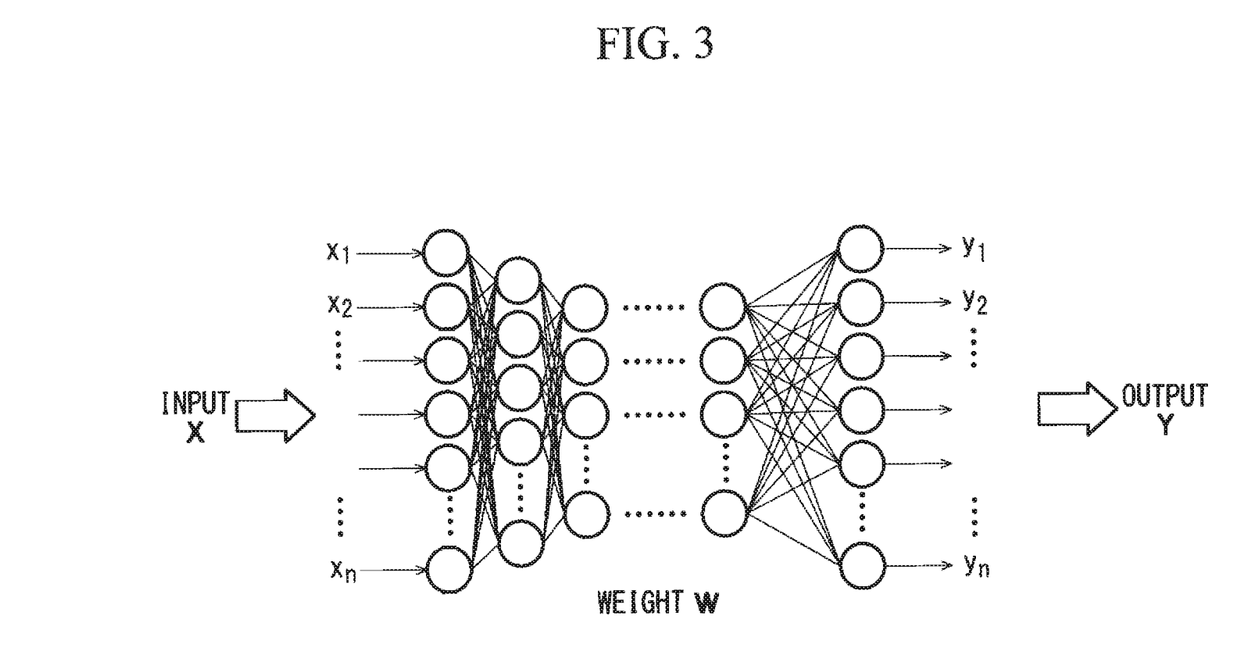
FIG. 3 is a schematic diagram describing a neural network in the machine learning unit.

In constructing the learning model 3131, a neural network illustrated in FIG. 3 is used. As illustrated in FIG. 3, three or more intermediate layers are preferably provided so that deep learning is performed.

As a result of learning, the weight W that minimizes the total of errors $\|D-Y\|^2$ is determined for all sets of the learning input data X and the learning labels D provided to the neural network illustrated in FIG. 3, and the learning model 3131 is constructed.

The input data provided to the machine learning unit 31 is the position and orientation of at least one body part of the worker 5, and is, for example, a position and an orientation of a hand or foot. The label provided to the machine learning unit 31 is the work status. The output of the machine learning unit 31, in other words, the output Y of the learning model=$\{y_1, y_2, \ldots y_m\}$ is, for example, the probability of the corresponding work status.

As illustrated in FIG. 2, the learning model 3131 may be connected to another cell controller via a network and may be shared as the learning model of the machine learning unit installed in the another cell controller.

In this manner, the learning efficiency of the learning model 3131 can be enhanced.

As illustrated in FIG. 1, the work status determining unit 32 is configured to determine the current work status on the basis of the positions and orientations of the body parts of the worker 5 detected by the sensor unit 2 and the learning model 3131 constructed in the machine learning unit 31.

The supply unit 4 is configured to supply the worker 5 with a tool or a part on the basis of the current work status determined in the cell controller 3. Specifically, the supply unit 4 includes a collaborative robot 41, a robot controller 42 that controls the collaborative robot 41, and a platform 43.

A hand 6, which is an end effector, and a camera (not illustrated in the drawing) are provided at the distal end of the arm of the collaborative robot 41, and the collaborative robot 41 is configured to grip a part on the platform 43 and supply the part to the worker 5 in response to the command from the robot controller 42.

Although not illustrated in the drawing, the robot controller 42 includes a processor, a memory device such as a read-only memory (ROM) or a random access memory (RAM), an external interface for exchanging various data between the collaborative robot 41 and the robot controller 42, etc., that are connected to one another via a bus so that the control command to the collaborative robot 41 is executed by the processor. The robot controller 42 controls the collaborative robot 41 on the basis of the work status determined in the cell controller 3, the work table stored in the memory device, and the information from the camera installed in the collaborative robot 41. More specifically, the robot controller 42 conducts a search in the work table stored in the memory device for the work status received from the cell controller 3, and commands the collaborative robot 41 to execute the robot movement associated with the corresponding work status. Moreover, the robot controller 42 detects the position and orientation of the palm on the basis of the image of the palm of the worker 5 taken with the camera installed in the collaborative robot 41, and moves the collaborative robot 41 so that the coordinate system preset for each part or tool is coincident with the coordinate system that indicates the position and orientation of the palm.

The platform 43 is a stage on which tools and parts necessary for the work are placed, and may be a parts rack, a tray, a tool box, or the like.

Instead of installing a camera in the collaborative robot 41, a camera connected to the robot controller 42 may be installed at a fixed position, and the collaborative robot 41 may be configured to grip a part on the platform 43 and supply the part to the worker 5 on the basis of the information from that camera.

The work assisting method performed in the work assisting system 1 configured as described above will now be described with reference to FIGS. 1 and 4.

Figure 4:
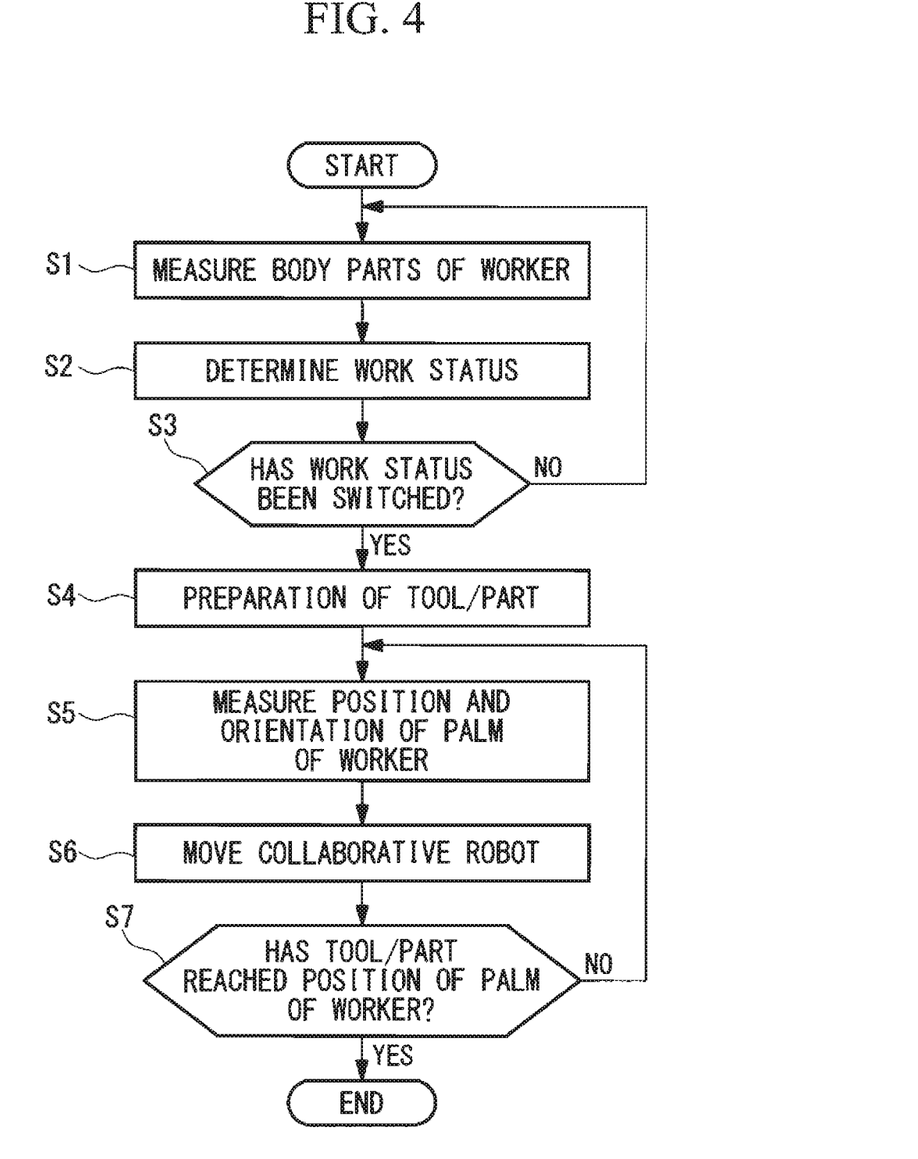
FIG. 4 is a flowchart illustrating the process to be executed in the work assisting system according to one embodiment of the present invention.

First, the sensor unit 2 sequentially measures the positions and orientations of the body parts of the worker 5 (step S1 in FIG. 4). Then the work status determining unit 32 of the cell controller 3 determines the work status on the basis of the measured positions and orientations of the body parts of the worker 5 (step S2 in FIG. 4). Next, the robot controller 42 sequentially monitors the work status received from the cell controller 3 and determines whether the work status has been switched (step S3 in FIG. 4). When it is determined that the work status has not changed, the step S1 and the step S2 are repeated. When it is determined that the work status has been switched, the next process is performed.

When it is determined that the work status has been switched, the robot controller 42 conducts a search in the work table stored in the memory device for the work status after switching. Then the robot controller 42 sends a control command to the collaborative robot 41 so that the collaborative robot 41 executes the robot movement associated with the corresponding work status.

The robot movement is basically a movement that supplies a tool or a part to the worker 5. Thus, first, the collaborative robot 41 selects a tool or a part from the platform 43 and grips it with the hand 6 according to the control command from the robot controller 42, so as to prepare for supplying the tool or the part to the worker 5 (step S4 in FIG. 4).

Subsequently, the camera installed in the collaborative robot 41 takes an image that includes the palm of the worker 5, and the position and orientation of the palm of the worker 5 is measured by the robot controller 42 (step S5 in FIG. 4). Then the collaborative robot 41 is controlled by the robot controller 42, and is moved so that the position and orientation of the palm of the worker 5 is coincident with the preset coordinate system for the tool or part (step S6 in FIG. 4).

Next, whether the tool or part has reached the position of the palm of the worker 5 is determined (step S7 in FIG. 4). This determination may be made on the basis of the image taken with the camera of the collaborative robot 41 or on the basis of the feedback from a force sensor installed in the hand 6 of the collaborative robot 41.

When it is determined that the tool or part has not reached the position of the palm of the worker 5, the step S5 and the step S6 are repeated. When it is determined that the tool or part has reached the position of the palm of the worker 5, the process is ended.

(Example)

In the description below, an example of applying the work assisting system 1 according to the present embodiment is described by using an example of a work that involves attaching one cover onto one chassis with hands and then performing screw fastening at four positions by using one driver and four screws.

Figure 5:
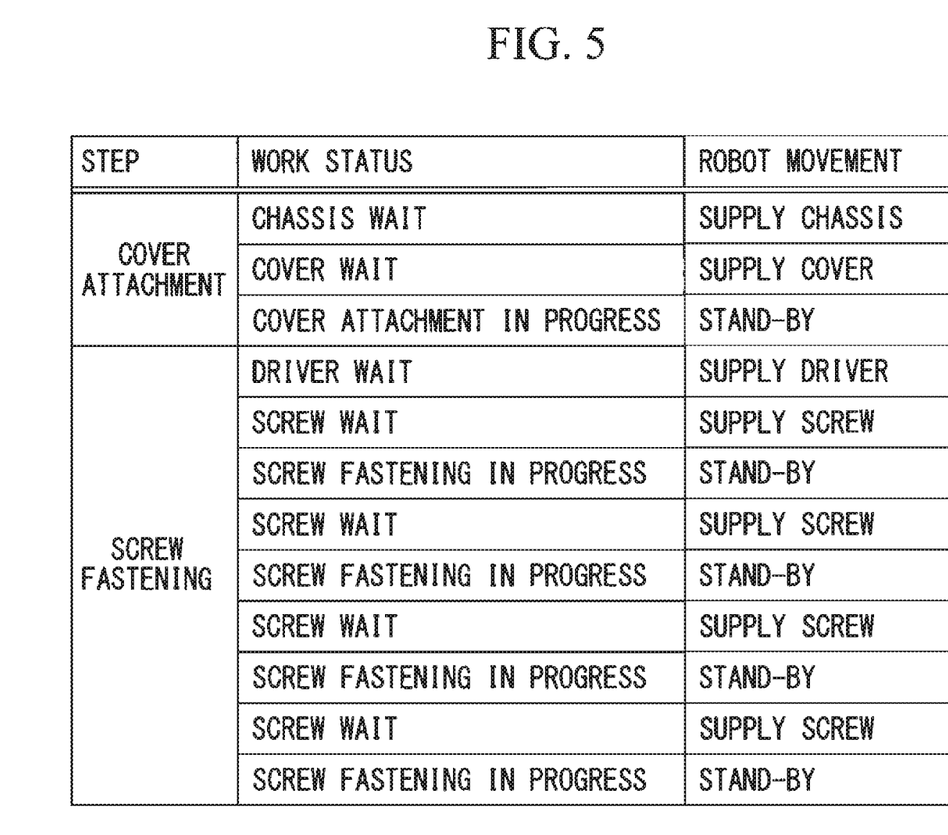
FIG. 5 is a diagram illustrating an example of a work table used in the work assisting system according to one embodiment of the present invention.

As illustrated in FIG. 5, the steps of this work are a cover attaching step and a screw fastening step. The work statuses of the worker 5 in the cover attaching step are a chassis wait status, a cover wait status, and a cover attachment in progress status. The work statuses of the worker 5 in the screw fastening step are a driver wait status, a screw wait status, and a screw fastening in progress status. Since there are four screws, there are four screw wait statuses and four screw fastening in progress statuses.

Figure 6:
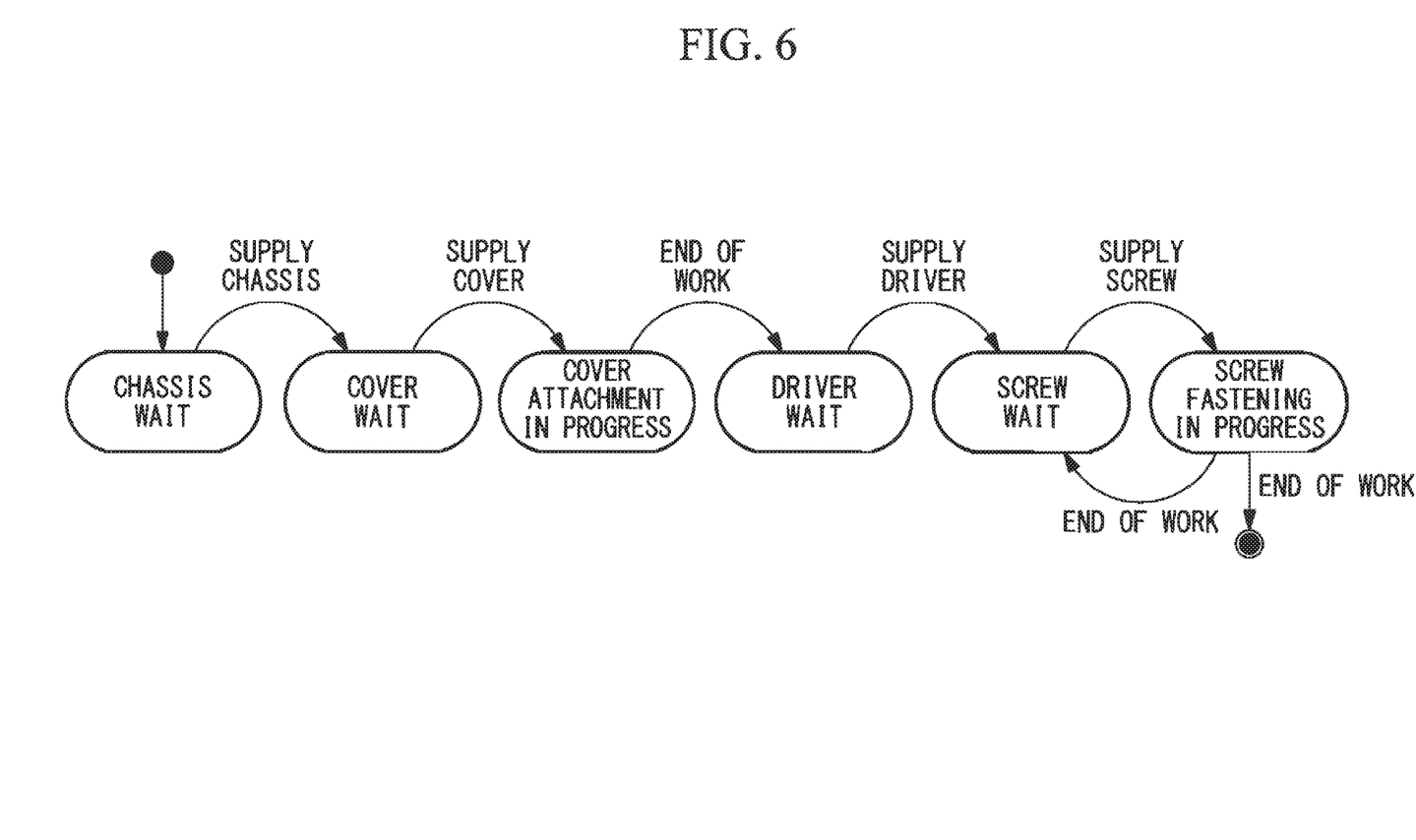
FIG. 6 is a status transition diagram corresponding to the work table.

As illustrated in FIG. 6, the work statuses described above transition from one to another by a particular movement. That is, the chassis wait status transitions to the cover wait status when the chassis is supplied by the collaborative robot 41. The cover wait status transitions to the cover attachment in progress status when the cover is supplied by the collaborative robot 41. The cover attachment in progress status transitions to the driver wait status when the work by the worker 5 ends. The driver wait status transitions to the screw wait status when the driver is supplied by the collaborative robot 41. The screw wait status transitions to the screw fastening in progress status when a screw is supplied by the collaborative robot 41. The screw fastening in progress status transitions to the screw wait status when the work of the worker 5 ends. In this example, screw fastening is performed at four positions; thus, the transition from the screw wait status to the screw fastening in progress status is repeated four times, and then the work is completed.

In the work table illustrated in FIG. 5, the work statuses are associated with the robot movements with which a work status transitions to another work status. The cover attachment in progress status and the screw fastening in progress status transition to next statuses by the movement of the worker 5; thus, the robot movement is set to a stand-by status. However, in order to enhance the efficiency of the work, the stand-by status is preferably entered after the robot selects and grips the tool or part so that the tool or part used in the next work can be immediately supplied to the worker 5.

The work table illustrated in FIG. 5 is prepared in advance and stored in the memory device in the robot controller 42.

In this example, the data obtained by normalizing the positions and orientations of the hands, head, and toes of the worker 5 is used as the learning data X. The learning labels D are obtained by normalizing six work statuses, namely, "chassis wait", "cover wait", "cover attachment in progress", "driver wait", "screw wait", and "screw fastening in progress". A large quantity of sets of the learning data X and the learning labels D are provided to the learning unit 313 to construct the learning model 3131.

As a result, when the data regarding the positions and orientations of the hands, head, and toes of the worker 5 obtained in actual work is input to the learning model 3131, the probabilities that the current work is at the respective work statuses is output as the output Y in the work status determining unit 32. The work status determining unit 32 determines that the work status with the highest probability is the current work status, and sends the current work status to the robot controller 42. For example, when the probability of "chassis wait" is the highest, "chassis wait" is assumed to be the current work status, and this output is sent to the robot controller 42.

The robot controller 42 conducts a search in the work table stored in the internal memory device for the "chassis wait", and obtains "supply chassis" as the robot movement associated with "chassis wait". Then the robot controller 42 controls the collaborative robot 41 so that the collaborative robot 41 performs "supply chassis".

The collaborative robot 41 picks the chassis up from the platform 43 and supplies the chassis to the worker 5. Here, the chassis is supplied to the worker 5 so that the position and orientation of the palm of the worker 5 are coincident with the preset coordinate system of the chassis.

Similarly, the above-described process is repeated until all of the work statuses in the work table are completed.

Since the work status of the worker 5 is determined by using the learning model 3131 constructed by the machine learning as such, the work status can be flexibly determined and the work can be assisted even when the manner and the timing of the work differ due to the individual differences among the workers 5. Moreover, preparation such as associating, in detail, the works conducted by the worker 5 with the respective steps is no longer necessary, and the work assisting system 1 can be more easily introduced.

The embodiment of the present invention has been described in detail with reference to the drawings, but the specific configuration is not limited to that of the embodiment and may include design modifications etc., within the scope of the present invention.

For example, although the image used for measuring the position and orientation of the palm of the worker 5 is taken by a camera installed in the collaborative robot 41 in the embodiment described above, the cameras 21 installed in the sensor unit 2 may be used instead of the camera installed in the collaborative robot 41.

As a result, the above-described embodiment leads to the following aspect.

An aspect of the present invention is directed to a work assisting system that includes a sensor unit that detects a position and an orientation of at least one body part of a worker; a supply unit that supplies a part or a tool to the worker; and a cell controller that controls the supply unit, the cell controller including a machine learning unit that constructs a model by learning a work status of the worker on the basis of the detected position and orientation, and a work status determining unit that determines the work status of the worker by using the constructed model, in which the supply unit selects the part or tool on the basis of the determined work status and changes the position and orientation of the part or tool on the basis of the position and orientation of the at least one body part.

With the work assisting system according to one aspect of the present invention described above, the position and orientation of at least one body part of the worker is detected by the sensor unit. On the basis of the detected position and orientation, the machine learning unit in the cell controller learns the work status of the worker and constructs a model. Then by using the constructed model, the work status determining unit in the cell controller determines the work status of the worker. Then, the supply unit selects the part or tool to be supplied to the worker on the basis of the determined work status. Then, the position and orientation of the part or tool is changed on the basis of the position and orientation of at least one body part of the worker to supply the part or tool to the worker.

As described above, since the work status of the worker is determined by using the model constructed by machine learning, the work status can be flexibly determined and the work can be assisted even when the manner and the timing of the work differ due to the individual differences among the workers. Moreover, preparation such as associating, in detail, the worker with the respective steps of work is no longer necessary, and the work assisting system can be more easily introduced.

In the work assisting system according to the aspect of the present invention described above, the model constructed in the machine learning unit may be shared as a model constructed in another cell controller connected to the cell controller via a network.

In this manner, the learning efficiency by machine learning can be enhanced.

In the work assisting system according to the aspect of the present invention described above, the supply unit may include a robot.

In the work assisting system according to the aspect of the present invention described above, the machine learning unit may include a neural network.

The present invention offers an advantageous effect in that the situations can be flexibly determined and the work can be assisted even when the manner and the timing of the work differ due to the individual differences among the workers. Moreover, the present invention offers an advantageous effect in that the work assisting system can be more easily introduced.

The invention claimed is:

1. A work assisting system comprising:
a sensor unit that detects a position and an orientation of each of the body parts including a hand of a worker;

a supply unit that supplies a part or a tool to the worker; and a cell controller that controls the supply unit, the cell controller comprising:

a machine learning unit that constructs a learning model based on the detected position and orientation of the each of the body parts and a label relating to a work status of the worker, and a work status determining unit that determines the work status of the worker by using the constructed learning model, wherein the supply unit selects the part or tool based on the determined work status and a work table in which the labeled work status is correlated to a motion of the supply unit, and changes a position and orientation of the part or tool based on the position and orientation of the each of the body parts.

2. The work assisting system according to claim 1, wherein the model constructed in the machine learning unit is shared with another cell controller connected to the cell controller via a network.

3. The work assisting system according to claim 1, wherein the supply unit includes a robot.

4. The work assisting system according to claim 1, wherein the machine learning unit includes a neural network.

5. The work assisting system according to claim 1, wherein the supply unit changes the position and orientation of the part or tool so that a coordinate system preset for each of the part or tool is coincident with a coordinate system that indicates the position and orientation of the each of the body parts.

6. The work assisting system according to claim 1, wherein the machine learning unit constructs the learning model based on data obtained by normalizing the position and orientation of the each of the body parts as learning data, and data obtained by normalizing the work status as the label.

* * * * *